United States Patent [19]
Leung

[11] Patent Number: 5,845,322
[45] Date of Patent: Dec. 1, 1998

[54] MODULAR SCALABLE MULTI-PROCESSOR ARCHITECTURE

[75] Inventor: Steve Leung, San Jose, Calif.

[73] Assignee: VLSI Technology, Inc., San Jose, Calif.

[21] Appl. No.: 718,057

[22] Filed: Sep. 17, 1996

[51] Int. Cl.⁶ .................................................. G06F 12/00
[52] U.S. Cl. ......................... 711/151; 711/124; 711/150; 711/154
[58] Field of Search ..................... 395/200.42, 200.44, 395/200.14; 711/211, 106, 120, 151; 701/104

[56] References Cited

U.S. PATENT DOCUMENTS

| | | | |
|---|---|---|---|
| 4,481,578 | 11/1984 | Hughes et al. | 395/200.42 |
| 4,539,656 | 9/1985 | Abrant | 711/211 |
| 4,760,521 | 7/1988 | Rehwald et al. | 711/106 |
| 5,136,500 | 8/1992 | Lemay et al. | 395/200.44 |
| 5,182,801 | 1/1993 | Asfour | 395/200.14 |
| 5,287,485 | 2/1994 | Umina et al. | 711/120 |
| 5,454,095 | 9/1995 | Kraemer et al. | 701/104 |

*Primary Examiner*—Tod R. Swann
*Assistant Examiner*—Fred F. Tzeng
*Attorney, Agent, or Firm*—Wagner, Murabito & Hao

[57] ABSTRACT

An architecture and method for communicating between multiple processors. In one embodiment, first data is transferred from a first processor into a first memory. In the present embodiment, multiplexing circuitry connects the first processor to the first and second memories, but the first processor only has access to the first memory. Similarly, second data is transferred from the second processor into the second memory. Multiplexing circuitry connects the second processor to the first and second memories, but the second processor only has access to the second memory. In the present embodiment, the multiplexing circuitry switches the connection between the first processor and the first and second memories and the second processor and the first and second memories. In so doing, the first processor is switched from having access only to the first memory to having access only to the second memory. Likewise, the second processor is switched from having access only to the second memory to having access only to the first memory. Next, the second data is transferred from the second memory into the first processor such that the first processor receives the second data previously transferred into the second memory by the second processor. Similarly, the first data is transferred from the first memory into the second processor such that the second processor receives the first data previously transferred into the first memory by the first processor. In such a manner, the present invention provides for communication between multiple processors.

18 Claims, 5 Drawing Sheets

MODULAR SCALABLE MULTI-PROCESSOR ARCHITECTURE

TECHNICAL FIELD

The present claimed invention relates to the field of multiple processor architectures. More specifically, the present claimed invention relates to memory configurations in multiple processor environments.

BACKGROUND ART

Exchanging data between multiple processors is advantageous in many applications. For example, when multiple processors are performing related tasks, information generated by one of the processors may need to be operated on by another processor. As a specific example, in digital signal processing, a voice coder (vocoder) processor might manipulate an incoming signal. A sound effect processor may then be required to operate on the signals manipulated by the vocoder processor. In such a scenario, it is apparent that the signals manipulated by the vocoder processor need to be exchanged with the sound effect processor.

With reference now to Prior Art FIG. 1, a conventional method for exchanging information between multiple processors is shown. As shown in Prior Art FIG. 1, a vocoder processor 10 and a sound effect processor 12 are connected through a dual port random access memory (RAM) device. The use of dual port RAM has several significant disadvantages associated therewith. For example, the cell size of dual port RAM is relatively large. Because of the additional complexity introduced by the dual port RAM, a complex operating system is required to ensure that each of processors 10 and 12 access dual port RAM 14 at the proper time. In addition, 8 transistor (8T) cells are used as the memory cells in conventional dual port RAM arrays. As a result, dual port RAM consumes large amounts of wafer real estate. In fact, dual port RAM 14 may consume almost twice as much real estate as standard static RAM (SRAM).

With reference next to Prior Art FIG. 2, another conventional method for exchanging data is shown. In the embodiment of Prior Art FIG. 2, two first-in-first-out (FIFO) buffers 16 and 18 are used by processors 10 and 12 respectively. As shown in Prior Art FIG. 2, each of processors 10 and 12 can only write to one of FIFOs 16 and 18. Thus, processor 10 can only write to FIFO 18, and processor 12 can only write to FIFO 16. Each of FIFOs 16 and 18 has a limited storage capacity, therefore, only a specific amount of data can be written into or read from each FIFO at a given time. Additionally, in the embodiment of Prior Art FIG. 2, after the data is read and processed, the data cannot be read a second time. In order to preserve the data and its ordering, the data must be stored before the data is processed.

Thus, a need exists for a processor independent method and apparatus for communicating between multiple processors. Another need exists for a method for exchanging or passing information between multiple processors. Still another need exists for a method which meets the above requirements without requiring a complicated operating system, a method which is scalable, and a method which is easily implemented.

DISCLOSURE OF THE INVENTION

The present invention provides a processor independent, scalable, easily implemented method and apparatus for communicating between multiple processors wherein the invention does not require the use of a complicated operating system. The present invention meets the above needs with a swap memory method and apparatus.

Specifically, in one embodiment, first data is transferred from a first processor into a first memory. In the present embodiment, multiplexing circuitry connects the first processor to the first or second memory. For example, the first processor only has access to the first memory. That is, the first processor can read to or write from only to the first memory. Similarly, in the present example, the second processor has access only to the second memory. Thus, the second processor can read from or write to only the second memory. In the present embodiment, multiplexing circuitry switches the connection between the first processor and the first and second memories and the second processor and the first and second memories. In so doing, the first processor is switched from having access only to the first memory to having access only to the second memory. Likewise, the second processor is switched from having access only to the second memory to having access only to the first memory. Next, the second data is transferred from the second memory into the first processor such that the first processor receives the second data previously transferred into the second memory by the second processor. Similarly, the first data is transferred from the first memory into the second processor such that the second processor receives the first data previously transferred into the first memory by the first processor. In such a manner, the present invention provides for communication between multiple processors.

In another embodiment, the multiplexing circuitry is configured such that the first and second processors access respective first and second memories concurrently. As a result, the first and second processors are able to operate independently of each other and are also able to access separate memories at the same time.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
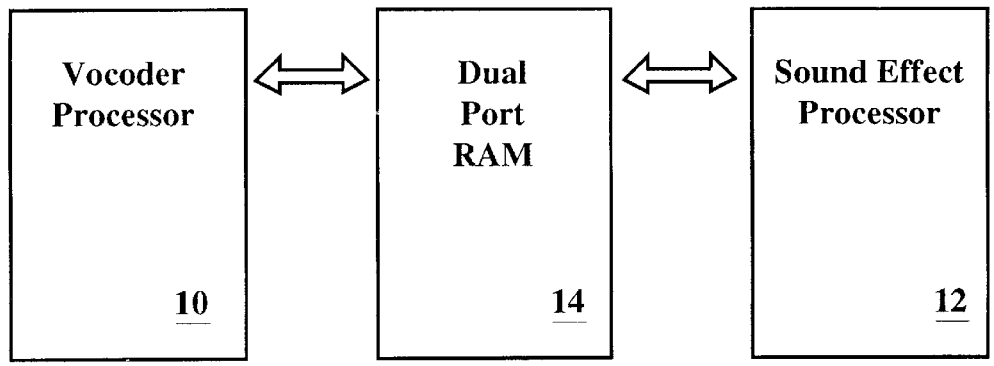
FIG. 1 is a schematic diagram of a conventional method for exchanging data between multiple processors using a dual port random access memory (RAM) device.
Figure 2:
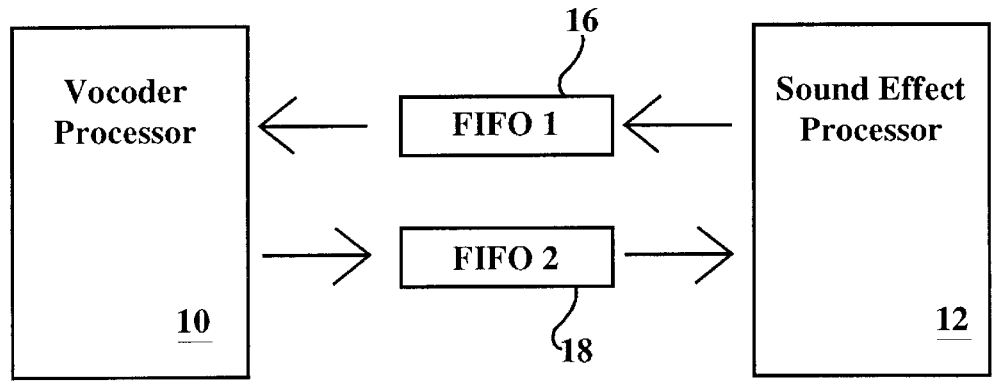
FIG. 2 is a schematic diagram of another conventional method for exchanging data using two first-in-first-out (FIFO) buffers.
Figure 3A:
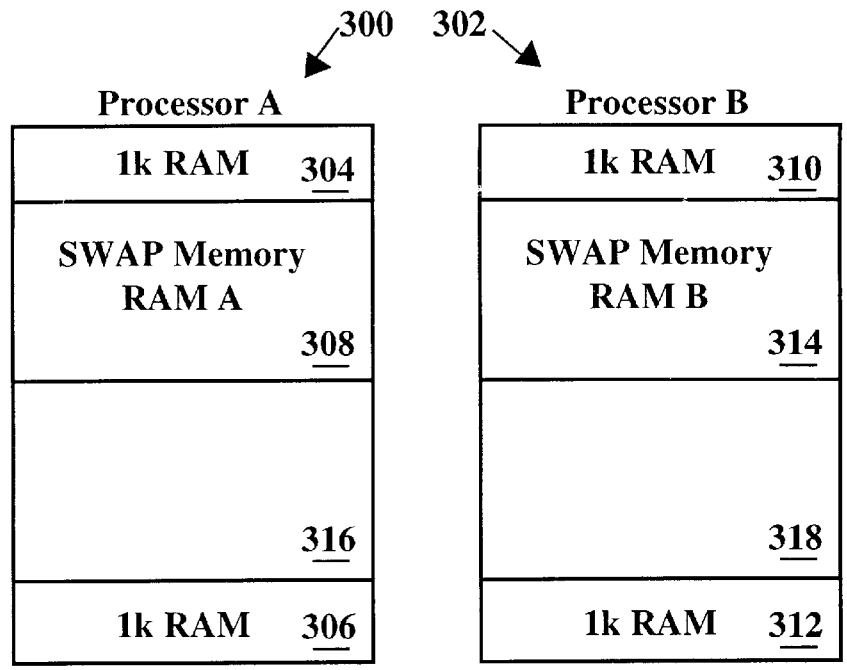
FIG. 3A is a schematic diagram of a memory map used in one embodiment of a swap memory configuration before memory swapping has occurred in accordance with the present claimed invention.

With reference now to FIG. 3A, a schematic diagram of a memory map used in accordance with one embodiment of the present invention is shown. The schematic diagram of FIG. 3A illustrates the status of the memory map prior to the memory swapping procedure of the present invention. The present invention provides an architecture and a method for sharing information between multiple processors using conventional SRAM memory. As shown in FIG. 3A, a first memory map 300 for processor A allots a specific amount of RAM to processor A. Likewise, a second memory map 302 allots a specific amount of memory to processor B. In the present embodiment, each of processors A and B have 64K bytes of standard SRAM allotted thereto. Although such an amount and type of memory is recited in the present embodiment, the present invention is also well suited to using various other types and amounts of memory. Furthermore, although only two processors, A and B, are shown in the embodiment of FIG. 3A, the present invention is scalable. That is, the present invention is well suited to use in applications where more than two processors need to exchange data. In such an embodiment, each of the multiple processors would have a respective memory map associated therewith.

With reference still to FIG. 3A, as an example, in memory map 300, 1K RAM portion 304 and 1K RAM portion 306 are used only by processor A. Similarly, 1K RAM portion 310 and 1K RAM portion 312 are used only by processor B. Such dedicated memory is used by the respective processor, for example, as a part of the RAM requirement for the specific DSP application. The remaining portion of the memory is allocated as swap memory. In the present embodiment, portion 316 is unused memory space. For purposes of the present application, swap memory refers to memory which can be accessed by either processor A or processor B. Thus, in the present embodiment, 62K of RAM are available to both processor A and processor B as swap memory. Although 62K of RAM are available in the present embodiment, not all of the available memory needs to be used. That is, processors A and B may only need to share information which typically occupies 5K of RAM. As such, a 5K portion 308 of RAM is dedicated as swap memory in memory map 300 of processor A, and a 5K portion 314 of RAM is dedicated as swap memory in memory map 302 of processor B. The remaining portion 316 and 318 of the memory maps of processors A and B remain unassigned. Additionally, although 2K of RAM are specified as dedicated memory in the present embodiment, the present invention is also well suited to dedicating various other amounts of RAM to a given processor.

Figure 3B:
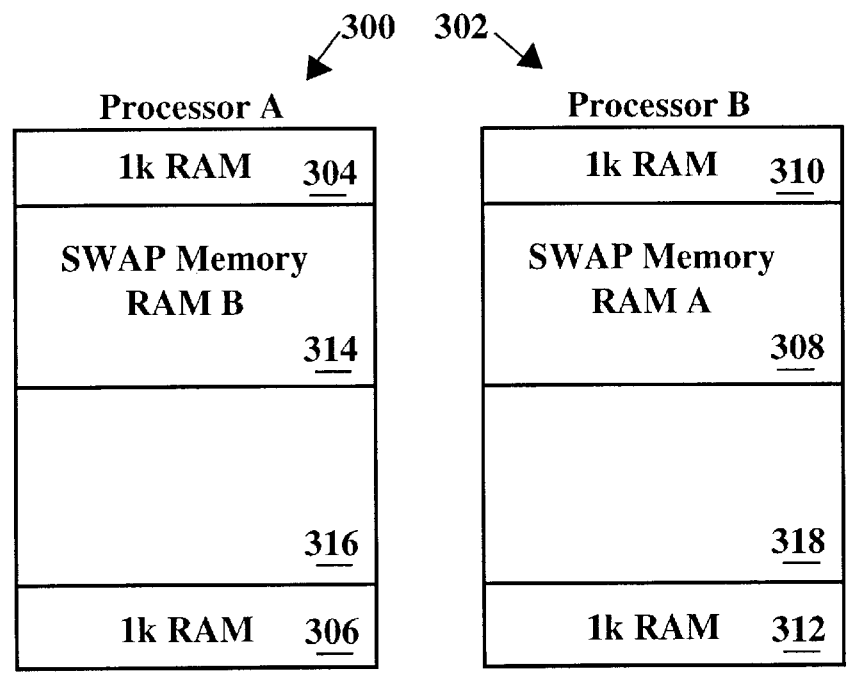
FIG. 3B is a schematic diagram of a memory map used in one embodiment of a swap memory configuration after memory swapping has occurred in accordance with the present claimed invention.

With reference next to FIG. 3B, a schematic diagram of memory maps 300 and 302 after memory swapping has occurred is shown. After the memory swapping procedure of the present invention, swap memory portion 308 is now included in the memory of processor B. Likewise, swap memory portion 314 is now included in the memory of processor A. Thus, processors A and B are able to exchange or share memory information contained in the swap memory. More specifically, processor A can write information into swap memory 308 when swap memory 308 is included in the memory of processor A. Likewise, processor B can write information into swap memory 314 when swap memory 314 is included in the memory of processor B. After the swap memory portions are swapped, as shown in FIG. 3, processor B can read or modify the information previously written by processor A, and processor A can read or modify the information previously written by processor B. Thus, processors A and B can share or exchange information and/or communicate using the memory swapping procedure of the present invention.

As a further advantage, the present invention allows multiple processors to concurrently access memory which is shared between the multiple processors. That is, processor A can write into or read from, for example, swap memory 308 at the same time processor B writes into or reads from swap memory 314. Thus, the present invention eliminates contention problems associated with prior art data sharing methods.

Figure 4:
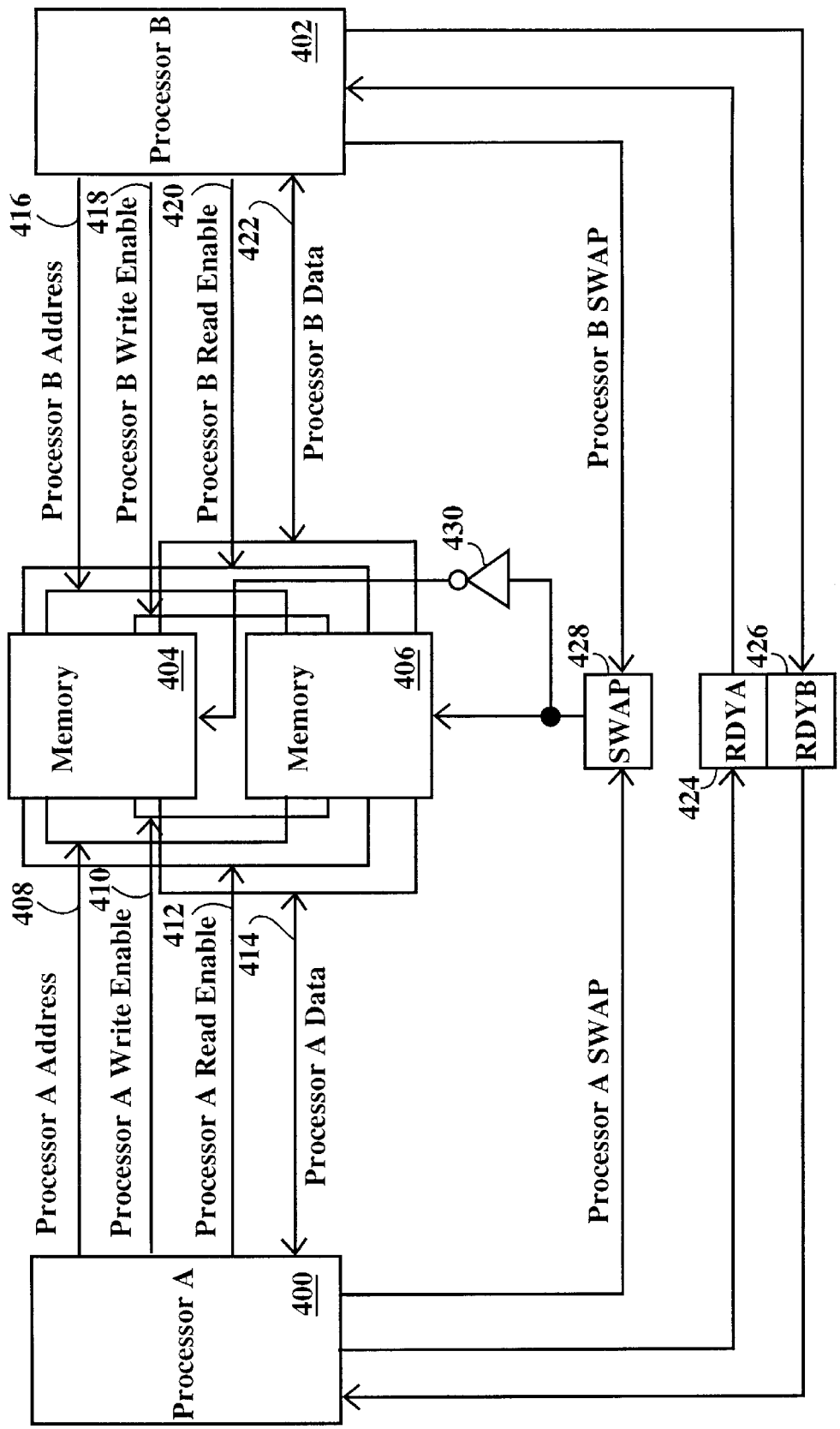
FIG. 4 is a schematic diagram of one embodiment of a swap memory configuration in accordance with the present claimed invention.

Referring now to FIG. 4, a schematic diagram of one embodiment of a swap memory configuration in accordance with the present claimed invention is shown. In the present embodiment, processor A 400 and processor B 402 are each coupled to swap memory 404 and swap memory 406. Specifically, processor A is coupled to swap memory 404 and swap memory 406 via address lines 408, processor A write enable lines 410, processor A read enable lines 412, and processor A data lines 414. Processor B is coupled to swap memory 404 and swap memory 406 via address lines 416, processor B write enable lines 418, processor B read enable lines 420, and processor B data lines 422. In the present invention, multiplexing circuitry couples the address, write enable, read enable, and data lines extending from processors A and B to each of swap memories 404 and 406. The multiplexing circuitry allows each of processors A and B to access only one of swap memories 404 and 406 at a given time. Furthermore, the multiplexing circuitry insures that processors A and B access different memories at a given time. That is, when the multiplexing circuitry provides processor A with access to, for example, swap memory 404, the multiplexing circuitry provides processor B with access to swap memory 406. On the other hand, when the multiplexing circuitry provides processor B with access to, for example, swap memory 404, the multiplexing circuitry provides processor A with access to swap memory 406. The multiplexing circuitry used in the present invention is described below in detail. Although swap memory 404 and swap memory 406 are shown physically separate from processors A and B in the embodiment of FIG. 4, it will be understood that swap memories 404 and 406 can physically reside within blocks 400 and 402 respectively. Additionally, for purposes of clarity, only single address, write enable, read enable, and data lines are shown extending from processors A and B in FIG. 4. It will be understood by those of ordinary skill in the art, that multiple address, write enable, read enable, and data lines may extend from each of processors A Referring still to FIG. 4, processor A is coupled to a ready bit RDYA 424. Processor B is coupled to a ready bit RDYB 426. Both processor A and processor B are coupled to a toggling device 428. For purposes of the present application, toggling device 428 is referred to as a swap device. Swap device 428 is coupled to the multiplexing circuitry which connects processors A and B to swap memories 404 and 406. The present invention also includes an inverter 430 such that when swap device 428 transmits toggles its logic level, if swap memory 406 receives a logic level of 1 from swap device 428, swap memory 404 receives the logic level of 0. Therefore, if swap memory 406 receives a high level, swap memory 404 receives a low level. Likewise, if swap memory 406 receives a low level, swap memory 404 receives a high level. The details of the operation of RDYA 424, RDYB 426, and swap device 428 are discussed below.

Figure 5:
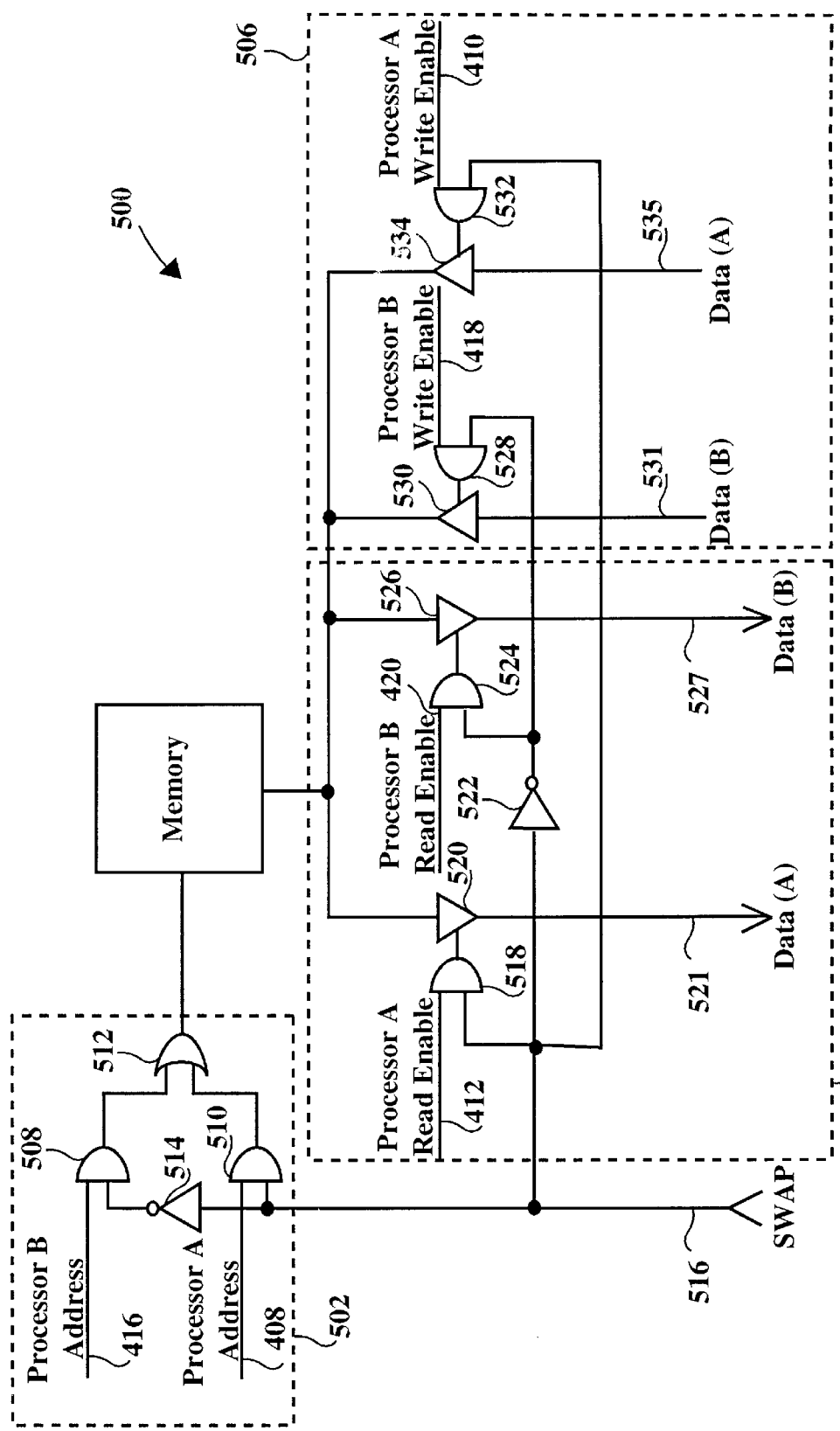
FIG. 5 is a diagram of a multiplexing circuit used in a swap memory configuration in accordance with the present claimed invention.

With reference next to FIG. 5, a diagram of a multiplexing circuit 500 used in the present swap memory invention is shown. The multiplexing circuit of FIG. 5 connects address, write enable, read enable, and data lines of processors A and B to swap memory 406 of FIG. 4. In the present embodiment, multiplexing circuitry 500 resides within the schematic depiction of swap memory 406 of FIG. 4. Although only a single multiplexing circuit 500 is shown in FIG. 5 for purposes of clarity, the present invention also includes a second identical multiplexing circuit for connecting address, write enable, read enable, and data lines of processors A and B to swap memory 404. Logic device 430 inverts the signal from swap device 428, such that the second multiplexing circuit receives an inverted signal. Multiplexing circuit 500 includes an address line multiplexing portion 502, a data read enable line multiplexing portion 504, and a data write enable line multiplexing portion 506. In the present embodiment, portion 502 is comprised of logic gates 508, 510, 512 and 514. Logic gate 510 has processor A address line 408 and swap line 516 as inputs. Thus, when processor A address line 408 is active and swap line 516 outputs a logic level of 1, logic gate 510 is enabled. Additionally, logic device 514 inverts the signal on swap line 516 such that when processor B address line 416 is active, logic gate 508 will not output an active signal because it is disabled. As a result, logic gate 512 only allows processor A address line 408 to access swap memory 406. Therefore, even when both processor A and processor B are outputting active signals onto their respective address lines, only one of the processors will be able to address swap memory 406. As mentioned above although only single address, read enable, and write enable line is shown for each processor in portions 502, it will be understood by those of ordinary skill in the art, that multiple address, read enable, and write enable lines for each processor may be present in each of portions 502, 504, and 506. In such an example, each of the lines will be coupled along with swap line 516 to a respective logic gate. The output from the logic gate will then be connected to swap memory 406. Additionally, because the second multiplexing circuit receives an inverted signal from swap device 428, an opposite result occurs at swap memory 404. That is, when processor A address line 408 is active and swap line 516 outputs a logic level of 1, logic gate 510 outputs an active signal because it is enabled. Additionally, logic device 430 of FIG. 4 inverts the signal on swap line 516 such that when processor A address line 408 has access to swap memory 406, the second multiplexing circuit will provide the address line of processor B access to swap memory 404.

Referring still to FIG. 5, data read enable line multiplexing portion 504 is comprised of logic gates 518, 520, 522, 524, and 526. Logic gate 518 has processor A read enable line 412 and swap line 516 as inputs. Thus, when processor A read enable line 412 is active and swap line 516 outputs an enable signal, logic gate 518 outputs an active signal to tri-state buffer 520 which drives processor A data in line 521. As a result, processor A is granted access to read data from swap memory 406. Additionally, logic device 522 inverts the signal on swap line 516 such that when processor B read enable line 420 is active, logic gate 524 will not output an active signal to the tri-state buffer 526. Thus, logic device 526 is tri-stated and processor B data in line 527 is not driven. As a result, processor B is not provided with access to read data from swap memory 406. Therefore, even when both processor A and processor B are outputting active signals onto their respective read enable lines, only one of the processors will be able to read data from swap memory 406. Additionally, because the second multiplexing circuit receives an inverted signal from swap device 428, an opposite result occurs at swap memory 404. That is, when processor A data in line 521 is driven at swap memory 406, the data in line of processor B is driven at swap memory 404. That is, logic device 430 inverts the signal on swap line 516 such that when processor A data in line 521 is driven, second multiplexing circuit will have the processor B data in line driven.

Referring again to FIG. 5, data write enable line multiplexing portion 506 includes logic gates 528, 530, 532, and 534. Logic gate 532 has processor A write enable line 410 and swap line 516 as inputs. Thus, when processor A write enable line 410 is active and swap line 516 outputs an enable signal, logic gate 532 outputs an active signal to tri-state buffer 534 which drives processor A data out line 535. As a result, processor A is granted access to write data into swap memory 406. Additionally, logic device 522 inverts the signal on swap line 516 such that when processor B write enable line 418 is active, logic gate 528 will not output an active signal to logic device 530. Thus, logic device 530 is tri-stated and processor B data out line 531 is not driven. As a result, processor B is not provided with access to write data into swap memory 406. Therefore, even when both processor A and processor B are outputting active signals onto their respective write enable lines, only one of the processors will be able to write data into swap memory 406. Additionally, because the second multiplexing circuit receives an inverted signal from swap device 428 of FIG. 4, an opposite result occurs at swap memory 404. That is, when processor A data in line 535 is driven at swap memory 406, the data in line of processor B is driven at swap memory 404. More specifically, logic device 430 of FIG. 4 inverts the signal on swap line 516 such that when processor A data in line 535 is driven, second multiplexing circuit will have the processor B data in line driven.

Thus, the present invention provides substantial advantages over the memory sharing or communication methods of the prior art. In the present invention, processors A and B will access a respective memory concurrently. That is, while processor A is accessing swap memory 406, processor B has access to swap memory 404. Hence, the present invention eliminates memory contention problems associated with the prior art. Additionally, by using the above described multiplexing circuitry, the present invention eliminates the need for a complicated operating system to control access privileges for each of processors A and B to swap memories 404 and 406. Furthermore, the present invention is also well suited to being used with more than two processors. Thus, the present invention provides a scalability not found in prior art memory sharing and processor communication methods. As yet another advantage, the present invention is able to operate using conventional SRAM memory. Conventional SRAM is formed of a standard 6 transistor cell arrangement as opposed to dual port RAM which requires an 8 transistor cell arrangement. As a result, the present invention can be implemented using less die space than is typically required prior art memory sharing and communication methods.

Figure 6:
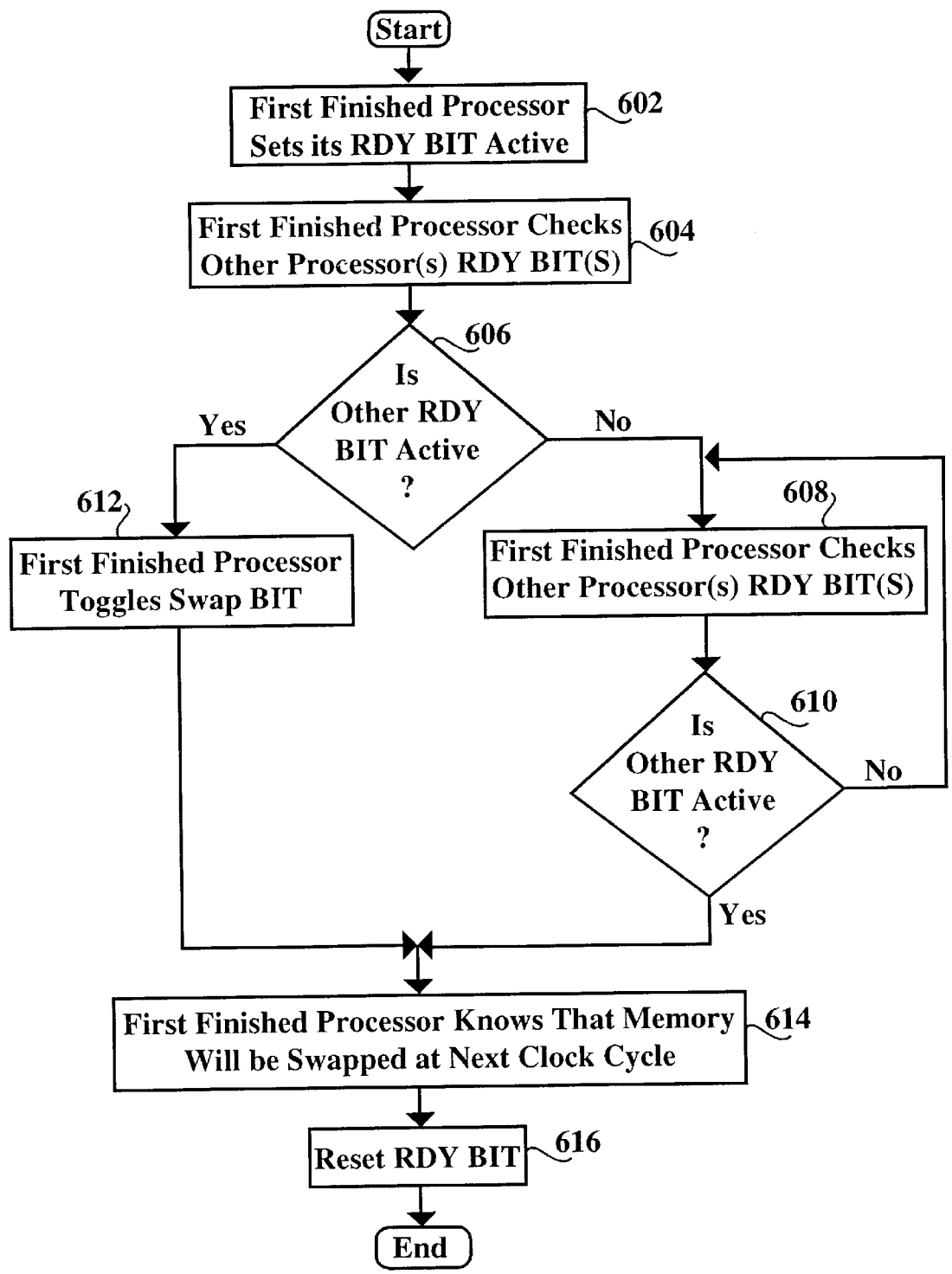
FIG. 6 is a flow chart of steps employed by the present swap memory configuration in accordance with the present claimed invention.

With reference next to FIG. 6, a flow chart of steps employed by the present swap memory invention is shown. The steps of FIG. 6 will be described in conjunction with the schematic diagram of FIG. 4. Processors A and B commonly operate independently of one another. However, when information or data needs to be shared or passed from one processor to another, the steps of FIG. 6 are employed. In the embodiment of FIG. 6, processor B 402 finishes its task first and wishes to pass information to processor A. As shown in step 602, the processor which finishes its task first, first finished processor, sets its ready bit (RDY) high or active. Thus, in the present embodiment, processor B 402 sets RDYB 426 active.

As shown in step 604 of FIG. 6, processor B then checks the status of processor A's ready bit (RDYA) 424.

In step 606 if RDYA 424 is not active, processor B continues to check the status of RDYA 424 at every clock cycle as shown in steps 608 and 610. It will be understood that the present invention is well suited to varying the frequency at which processor B checks RDYA 424. As mentioned above, in the embodiment of FIG. 6, processor A is the last processor to finish its task. Thus, after processor finishes its task, processor A sets RDYA to an active state. Therefore, eventually processor B will find that RDYA is active/high.

If, in step 606 if RDYA 424 is active, processor B (the first finished processor) toggles the swap bit as shown in step 612.

In step 614, after processor B finds that RDYA is active, processor B knows that on the next clock cycle, swap memories 404 and 406 will be swapped. More specifically, in the present invention the last processor to finish its task is responsible for toggling the swap device 428. Swap device 428 is comprised of toggling circuitry which alternately outputs either a high or low logic level. Thus, if the output of swap device 428 is high, the last finishing processor, processor A, causes swap device 428 to output a low. If the output of swap device 428 is set low, processor A causes swap device 428 to output a high level. The toggling of the swap device 428 switches the access provided to each of processors A and B. That is, toggling the signal output from swap device 428 alters the resultant connection provided by multiplexing circuitry 500 coupling processors A and B to swap memory 406. Similarly, toggling the signal output from swap device 428 alters the resultant connection provided by the multiplexing circuitry which couples processors A and B to swap memory 404. Thus, if processor A previously had access to swap memory 406, after toggling the signal output from swap device 428, processor A will now have access to swap memory 404. Likewise, processor B which previously had access to swap memory 404, after toggling the signal output from swap device 428, processor B will now have access to swap memory 406. Thus, information written into swap memory 406 by processor A can now be accessed by processor B, and information previously written into swap memory 404 by processor B can now be accessed by processor A. Hence, swap memories 404 and 406 are "swapped". By "swapping" memories processor A and B can readily share memory and communicate. Additionally, reading and writing into the memories can occur independently and simultaneously. That is, processor A can write into or read from one memory while processor B writes into or reads from another memory. In so doing, the present invention eliminates the waiting or contention problems associated with prior art memory sharing and communication methods. Again, it will be understood that the present invention is well suited to varying the number of clock cycles between when the last finishing processor sets its ready bit and when the memories are swapped.

As shown in step 616, after the memories have been swapped each of the processors resets its ready bit. Thus, if processor A was previously accessing swap memory 406, but after the swapping now accesses swap memory 404, activation of swap device 428 will again cause processor A to access swap memory 406. Hence, the present invention allows multiple processors to have toggling access to multiple separate memories. The present invention further allows the multiple memories to concurrently access the separate memories such that contention and waiting are eliminated.

Thus, the present invention provides a processor independent, scalable, easily implemented method and apparatus for communicating between multiple processors wherein the invention does not require the use of a complicated operating system. The present invention meets the above needs with a swap memory method and apparatus.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A circuit for exchanging information between multiple processors comprising:

a first memory;

a second memory;

a first processor coupled to both said first memory and said second memory;

a second processor coupled to both said first memory and said second memory; and multiplexing circuitry coupled to said first processor and said second processor, said multiplexing circuitry configured to control access of said first and said second processors to said first and second memories such that when said first processor has access to one of said first and second memories, said second processor has access to the other of said first and second memories, said first memory and said second memory not having transfer logic coupled therebetween, such that said circuit for exchanging information between multiple processors exchanges information between said first processor and said second processor without requiring the direct exchange of data in said first memory with data in said second memory.

2. The circuit of claim 1 for exchanging information between multiple processors comprising:
   a first address line coupling said first processor to said first and said second memories; and
   a second address line coupling said second processor to said first and second memories, said first and second address lines coupled to said multiplexing circuitry such that when said first processor addresses one of said first and second memories, said second processor addresses the other of said first and second memories.

3. The circuit of claim 1 for exchanging information between multiple processors comprising:
   a first data line coupling said first processor to said first and said second memories; and
   a second data line coupling said second processor to said first and second memories, said first and second data lines coupled to said multiplexing circuitry such that when said first data line of said first processor is enabled to one of said first and second memories, said second data line of said second processor is enabled to the other of said first and second memories.

4. The circuit of claim 1 for exchanging information between multiple processors wherein said multiplexing circuitry further comprises:
   toggling circuitry configured to control whether said first processor has access to said first memory or said second memory, said toggling circuitry configured such that when said first processor has access to one of said first and second memories, said second processor has access to the other of said first and second memories.

5. The circuit of claim 4 for exchanging information between multiple processors wherein said toggling circuitry is further configured to alternately provide said first processor with access to said first and second memories and alternately provide said second processor with access to the other of said first and second memories.

6. The circuit of claim 1 for exchanging information between multiple processors comprising wherein said first and second memories are comprised of standard memory structures.

7. A method of communicating between multiple processors comprising the steps of:
   a) transferring first data from a first processor into a first memory, wherein said first processor is coupled to both said first memory and a second memory but only has access to said first memory;
   b) transferring second data from said second processor into said second memory coupled to said second processor wherein said second processor is coupled to both said second memory and said first memory but only has access to said second memory, said first memory and said second memory not having transfer logic coupled therebetween;
   c) multiplexing a connection between said first processor and said first and second memories such that said first processor is switched from having access only to said first memory to having access only to said second memory;
   d) multiplexing a connection between said second processor and said first and second memories such that said second processor is switched from having access only to said second memory to having access only to said first memory;
   e) transferring said second data from said second memory into said first processor such that said first processor receives said second data previously transferred into said second memory by said second processor; and
   f) transferring said first data from said first memory into said second processor such that said second processor receives said first data previously transferred into said first memory by said first processor, said transferring of first and second data as recited in steps e) and f) occurring without requiring the exchange of said first data in said first memory with second data in said second memory.

8. The method of communicating between multiple processors as recited in claim 7 comprising the step of:
   performing steps e) and f) concurrently such that said first processor is receiving said second data previously transferred into said second memory by said second processor while said second processor is receiving said first data previously transferred into said first memory by said first processor.

9. The method of communicating between multiple processors as recited in claim 7 comprising the steps of:
   g) transferring third data from said first processor into said second memory, wherein said first processor only has access to said second memory;
   h) transferring fourth data from said second processor into said first memory coupled to said second processor wherein said second processor only has access to said first memory;
   i) multiplexing a connection between said first processor and said first and second memories such that said first processor is switched from having access only to said second memory to having access only to said first memory;
   j) multiplexing a connection between said second processor and said first and second memories such that said second processor is switched from having access only to said first memory to having access only to said second memory;
   k) transferring said fourth data from said first memory into said first processor such that said first processor receives said fourth data previously transferred into said first memory by said second processor; and
   l) transferring said third data from said second memory into said second processor that said second processor receives said third data previously transferred into said second memory by said first processor.

10. The method of communicating between multiple processors as recited in claim 7 comprising the step of:
    alternately multiplexing said connection between said first processor and said first and second memories and alternately multiplexing said connection between said second processor and said first and second memories such that said first processor alternately accesses said first and second memories and such that said second processor alternately accesses said first and second memories.

11. The method of communicating between multiple processors as recited in claim 7 wherein said first processor performs the steps of:
    g) activating a ready bit of said first processor, said activation of said ready bit of said first processor indicating that said first processor has transferred said first data into said first memory; and
    h) checking a ready bit of said second processor to determine whether said second processor has transferred said second data into said second memory;

i) activating a toggle bit if said ready bit of said second processor has been activated such that said first processor is switched from having access only to said first memory to having access only to said second memory, and such that said second processor is switched from having access only to said second memory to having access only to said first memory, and j) repeating step h) if said ready bit of said second processor has not been activated.

12. The method of communicating between multiple processors as recited in claim 11 comprising the steps of:

resetting said ready bit of said first processor after said toggle bit has been activated.

13. The method of communicating between multiple processors as recited in claim 7 wherein said second processor performs the steps of:

g) activating a ready bit of said second processor, said activation of said ready bit of said second processor indicating that said second processor has transferred said second data into said second memory; and h) checking a ready bit of said first processor to determine whether said first processor has transferred said first data into said first memory;

i) activating a toggle bit if said ready bit of said first processor has been activated such that said second processor is switched from having access only to said second memory to having access only to said first memory, and such that said first processor is switched from having access only to said first memory to having access only to said second memory, and j) repeating step h) if said ready bit of said first processor has not been activated.

14. The method of communicating between multiple processors as recited in claim 13 comprising the steps of:

resetting said ready bit of said second processor after said toggle bit has been activated.

15. A modular scalable multi-processor architecture comprising:

a first swap memory array;

a second swap memory array;

a first processor coupled by a first address line and a first data line to said first swap memory array and said second swap memory array;

a second processor coupled by a second address line and a second data line to said first swap memory array and said second swap memory array; and a multiplexor coupled to said first and second address and data lines such that when said first processor has access to one of said first and second swap memory arrays, said second processor has access to the other of said first and second swap memory arrays, said first swap memory array and said second swap memory array not having transfer logic coupled therebetween, such that said modular scalable multi-processor architecture exchanges information between said first processor and said second processor without requiring the direct exchange of data in said first swap memory array with data in said second swap memory array.

16. The modular scalable multi-processor architecture of claim 15 wherein said multiplexor comprises:

toggling circuitry configured to control whether said first processor has access to said first swap memory array or said second swap memory array, said toggling circuitry configured such that when said first processor has access to one of said first and second swap memory arrays, said second processor has access to the other of said first and second swap memory arrays.

17. The modular scalable multi-processor architecture of claim 16 wherein said toggling circuitry is adapted to alternately provide said first processor with access to said first and second swap memory arrays and alternately provide said second processor with access to the other of said first and second swap memory arrays.

18. The modular scalable multi-processor architecture of claim 15 wherein said first and second swap memory arrays are comprised of standard memory structures.

* * * * *